United States Patent

[11] 3,599,505

| [72] | Inventors | George H. Logan<br>Northbrook;<br>Claes L. Hultgren, Clarendon Hills, both of, Ill. |
|---|---|---|
| [21] | Appl. No. | 851,281 |
| [22] | Filed | Aug. 19, 1969 |
| [45] | Patented | Aug. 17, 1971 |
| [73] | Assignee | Logan Engineering Co.<br>Chicago, Ill. |

[54] VARIABLE SPEED PULLEY DRIVE
12 Claims, 11 Drawing Figs.

| [52] | U.S. Cl. | 74/230.17 |
|---|---|---|
| [51] | Int. Cl. | F16h 55/22 |
| [50] | Field of Search | 74/230.17 |

[56] References Cited
UNITED STATES PATENTS

| 1,235,794 | 8/1917 | Hardaker | 74/230.17 (A) |
| 2,486,524 | 11/1949 | Dulaney | 74/230.17 (A) |
| 3,354,748 | 11/1967 | Chapman | 74/230.17 (A) |
| 3,467,177 | 9/1969 | Hoddinott | 74/230.17 (A) |

*Primary Examiner*—Leonard Hall Gerin
*Attorney*—Davis, Lucas, Brewer and Brugman ABSTRACT: A variable speed power transmission which uses drive and driven pulley, each of which has an axially shiftable section to change the effective diameter thereof, the transmission having more uniform belt tension. Positive devices are provided for moving each shiftable pulley section toward its axially fixed section in place of the spring normally used on one of the pulley sections, and a single-control knob positions both shifting devices. The shifting devices comprise a rotatable cam and follower for each shiftable pulley section, with the followers actuating shift levers connected through a form of universal connection to said shiftable sections to relieve the pulleys of eccentric forces produced by the levers. Two forms of levers are described.

PATENTED AUG 17 1971
3,599,505
SHEET 1 OF 3
Fig. 1
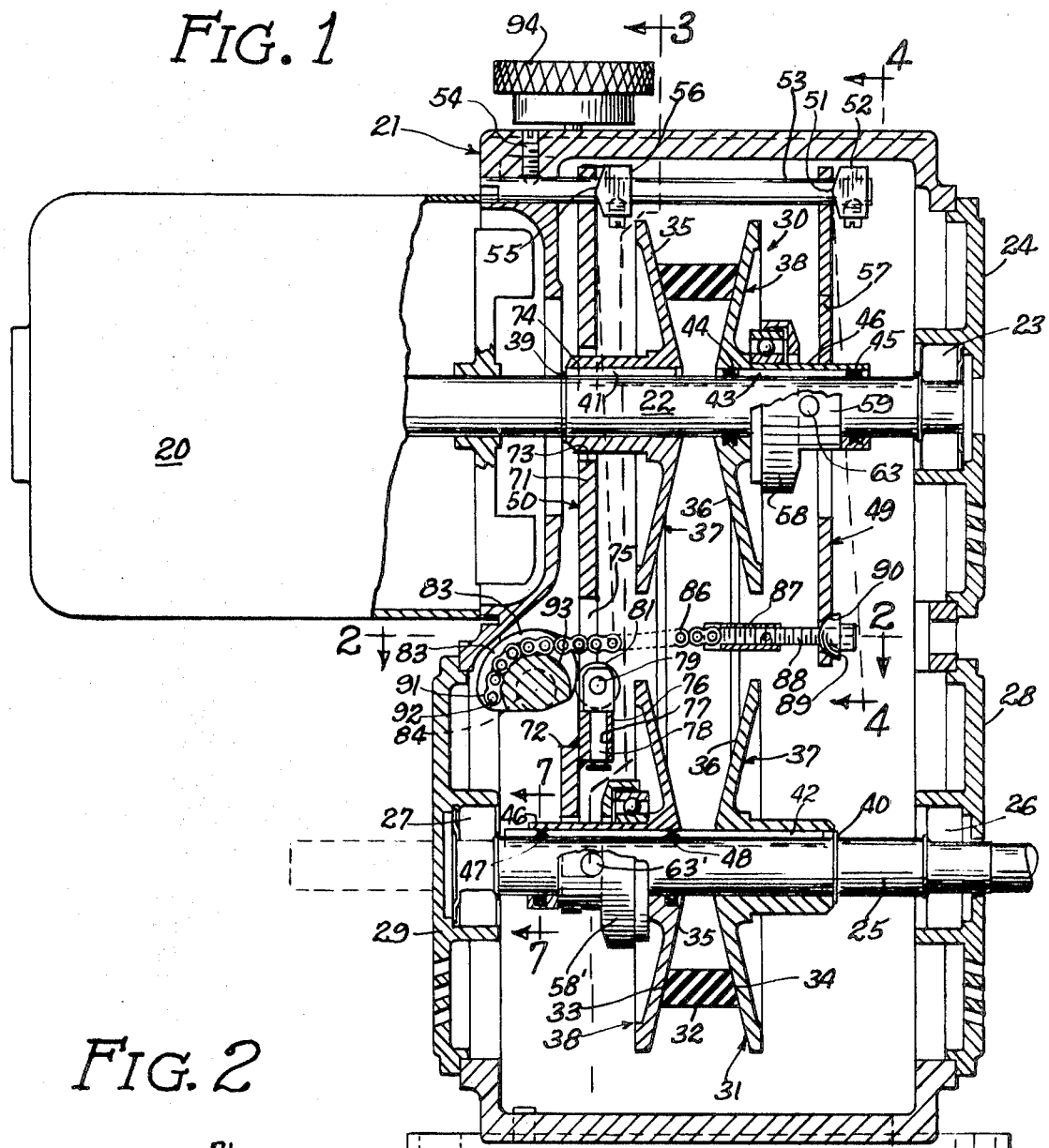
Fig. 2
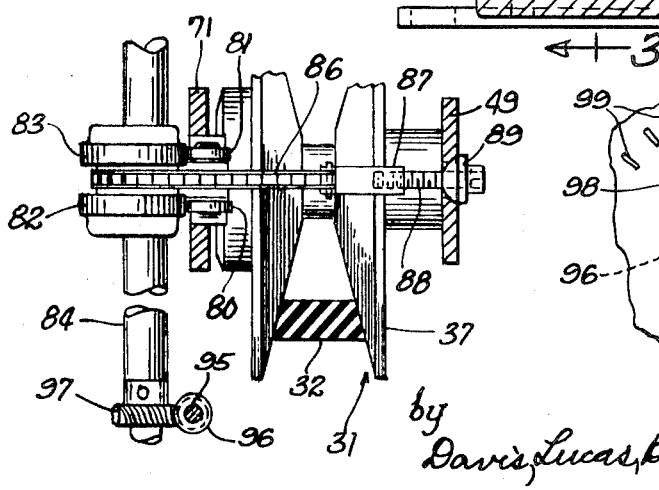
Fig. 8
INVENTORS
Claes L. Hultgren
George H. Logan
by Davis, Lucas, Brewer & Brugman Attys

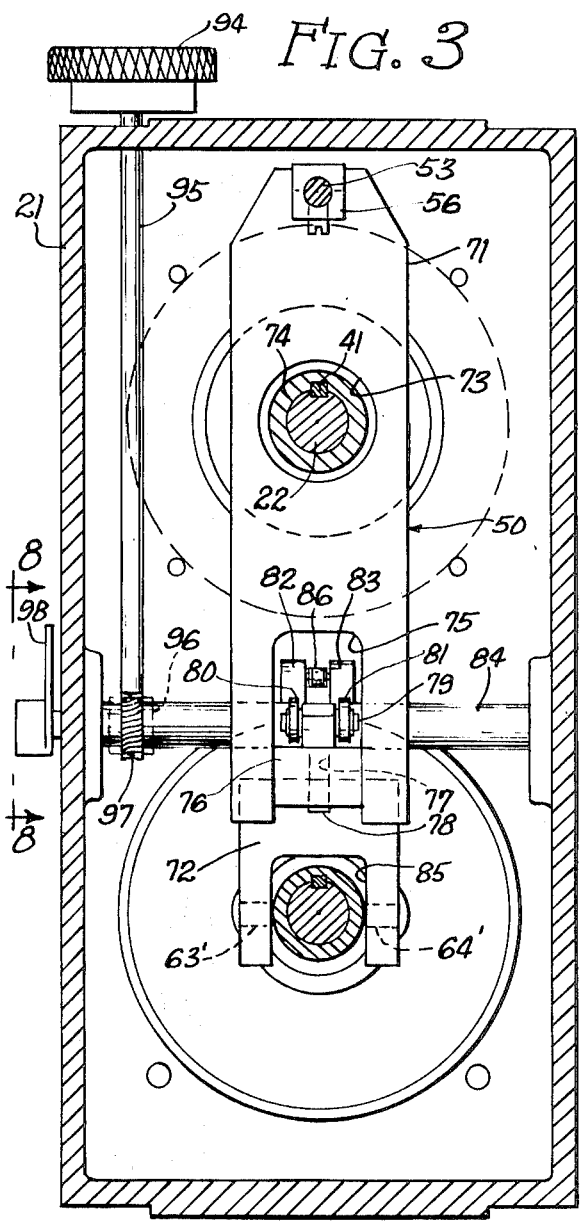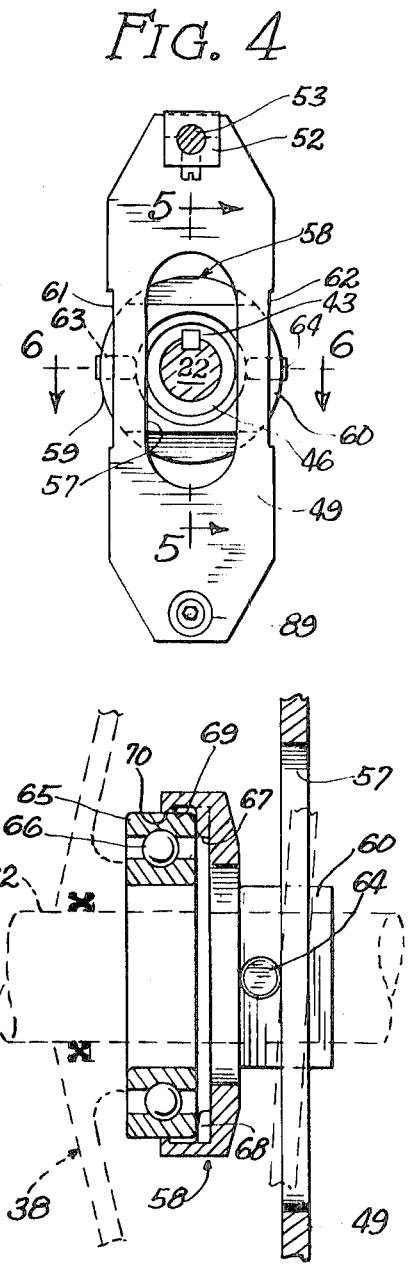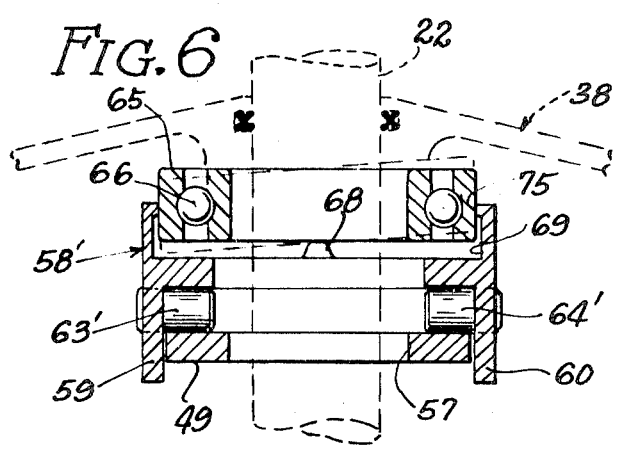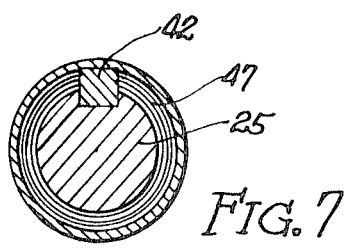

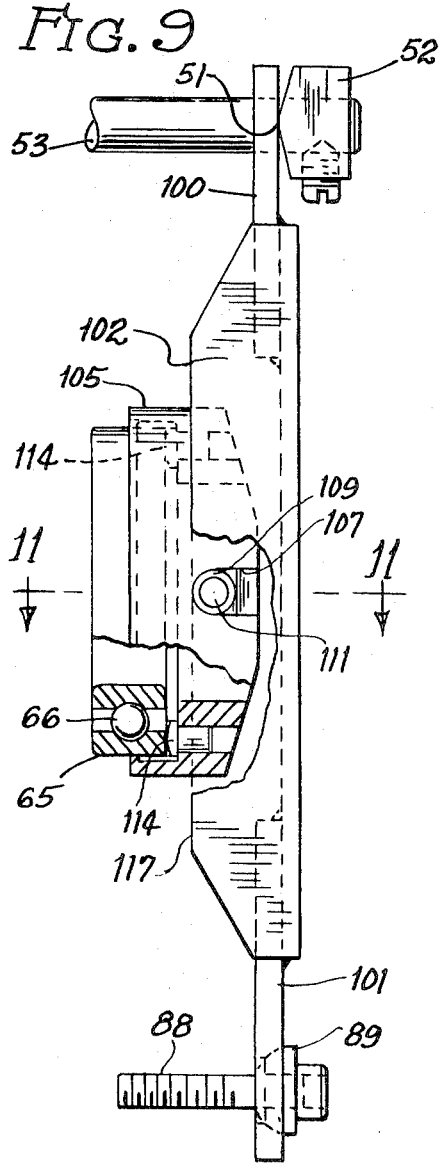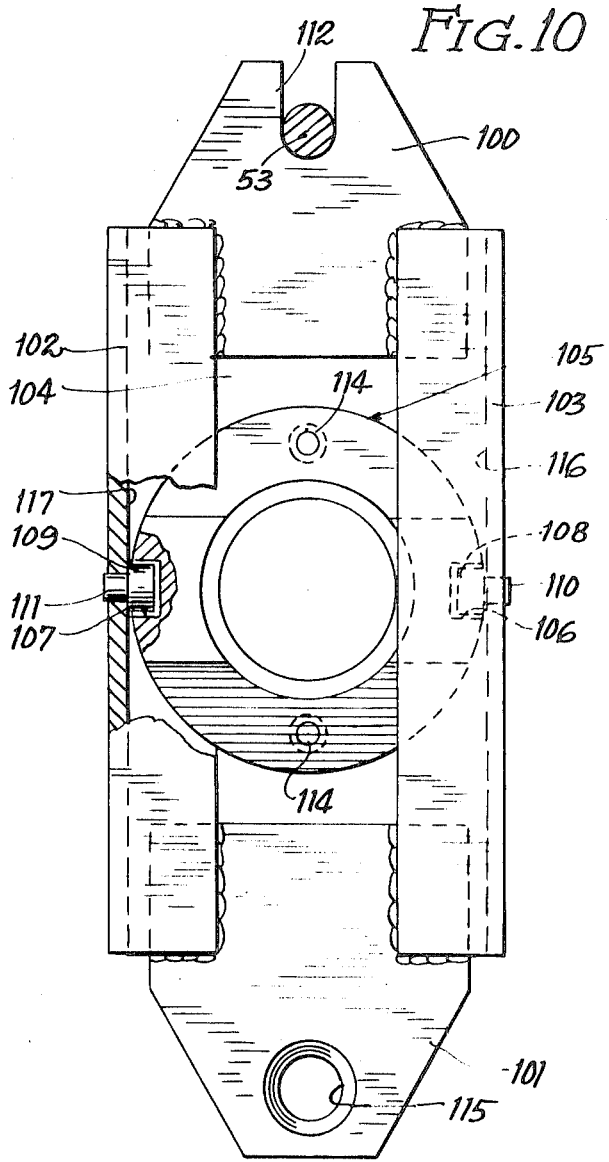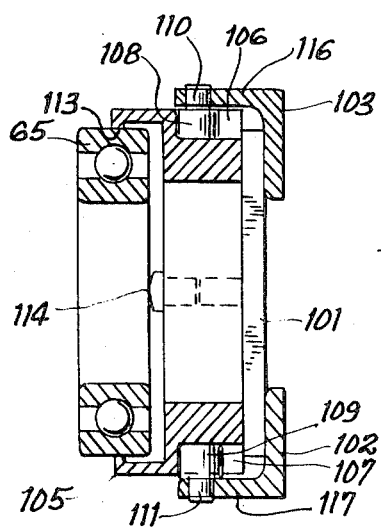

VARIABLE SPEED PULLEY DRIVE

This invention relates to variable speed pulley drives which effect a change in speed ratio between drive and driven pulleys by shifting sections axially movable section of each pulley toward pulley section away from a fixed pulley section thereof, thereby to change the effective diameter of said pulleys at which contact with a connecting belt is established.

Variable speed pulley drives utilizing axially shiftable pulley sections normally have a positive control on one of the axially shiftable pulley sections which pushes the said one shiftable pulley section toward its fixed pulley section against the spreading or separating action of the belt passing between the two sections. The shiftable section of the other pulley contacted by the belt is pushed toward the fixed section by a spring. This leaves the other pulley with no predetermined effective diameter, its diameter being dependent upon the vagaries of spring compression and its tendency to overreact and produce a vibration. This, in turn, is reflected in an undesired variation in speed in the driven members, as well as an undesired variation in belt tension.

It is also recognized that spring takeup pressure on one of the pair of pulley sections is detrimental to the efficiency of the transmission because of excessive friction losses, which in turn shorten the life of the drive belt. Spring takeup creates side pressures on the belt which must necessarily be more than is required to drive the belt since these side pressures must be sufficient to hold the pulley sections in a given position even though surges in the driven load may tend to pull the belt deeper into the pulley. Not only does this result in greater friction losses, but the friction losses generate heat which must then be dissipated.

As the belt is made to operate at differing pulley radii to produce different speed ratios, its thickness and cross-sectional contour will change as well as its stiffness, all of which affect the theoretical pitch line of the belt-and-pulley combination. Although the objective of such combinations in the past has been a constant belt length at the pitch line, on the theory that a constant length will produce a constant speed in the driven pulley, the variations in belt thickness, cross-sectional contour and stiffness as it passes around a pulley produce variations in belt tension which activates the spring to produce a variation in the drive.

The object of this invention is to provide means for simultaneously and controllably locating the two movable pulley sections of a variable speed pulley drive so as to maintain constant belt tension through the entire speed range of the variable speed drive.

A more specific object of this invention is to provide a positive control for the location of the shiftable sections of a variable speed pulley drive, wherein the separation of the pulley sections by the side thrust of the connecting belt is positively limited by levers, the angular positions of which are correlated by a common rotatable control through a cam and follower or the equivalent.

It is also within the purview of this invention to provide a positive control for the separation of driving and driven pulley sections of a variable speed pulley drive, said control including levers for moving the movable sections, with means disposed between the levers and movable sections for transmitting force from the levers in a manner to minimize the creation of nonaxial forces on the movable section.

These and other objects of this invention will become apparent from the following detailed description of the preferred embodiment thereof when taken together with the accompanying drawings, in which FIG. 1 is a front elevation, partly in section of a variable speed pulley-type transmission and motor incorporating this invention;

FIG. 2 is a fragmentary horizontal section through the transmission taken along line 2–2 of FIG. 1, looking in the direction of the arrows at the ends thereof;

FIG. 3 is a side elevational view in section of the variable speed pulley-type transmission of FIG. 1 taken along line 3–3 of FIG. 1 and looking in the direction of the arrows at the ends thereof;

FIG. 4 is a fragmentary side elevational view of one of the levers used in the transmission, the view being along line 4–4 of FIG. 1 and looking in the direction of the arrows at the ends thereof;

FIG. 5 is an enlarged fragmentary section through one of the controls taken along line 5–5 of FIG. 4;

FIG. 6 is an enlarged fragmentary horizontal section through the control of FIG. 5 taken along line 6–6 of FIG. 4;

FIG. 7 is a cross-sectional through the shaft and movable pulley section hub mounted thereon, the section being taken along line 7–7 of FIG. 1;

FIG. 8 is a fragmentary elevational view of a speed indicator for the transmission, the view being taken along line 8–8 of FIG. 3; and FIGS. 9, 10 and 11 are, respectively, front, side and plan views of a modification of a control lever for the transmission, the plan view being in sections and taken along line 11–11 of FIG. 9.

Referring now to the drawings for a detailed description of the preferred embodiment of the invention shown therein and particularly to FIG. 1, there is shown an electric motor 20 suitably mounted on a housing 21 for a variable speed pulley-type transmission, and having a drive shaft 22 extending through housing 21 into antifriction bearings 23 mounted in an end plate 24 secured to housing 21. A driven shaft 25 is mounted in spaced bearings 26 and 27 appropriately supported in end plates 28 and 29, respectively, secured to housing 21.

A V-type pulley, designated generally by the reference numeral 30, is mounted on drive shaft 22, and a substantially identical V-type pulley, designated by the reference character 31, is mounted on the driven shaft 25. An endless belt 32 passes around both pulleys and transmits the drive from the drive shaft 22 to the driven shaft 25. The drive is transmitted through the frustoconical sides 33 and 34 of belt 32 which contact the conical sides 35 and 36, respectively, of each pulley. The effective diameter at which the belt 32 will drive, or be driven from, a pulley demands basically upon the spacing between the conical sides 35 and 36 of each pulley. An infinite variety of speed ratios is obtained by forming the pulleys 30 and 31 in two sections, one section 37 of each pulley being axially fixed on its shaft and the other section 38 of each pulley being mounted on the shaft for axial sliding movement thereon.

The fixed section 37 of drive pulley 30 is prevented from moving axially to the left, as viewed in FIG. 1 by a snap ring 39 on shaft 22 and the fixed section 37 of driven pulley 31 is held against axial movement to the right, as viewed in FIG. 1, by a snap ring 40 on shaft 25. Said fixed sections 37 are constrained to rotate with their respective shafts by appropriate keys 41 and 42. Key 42 extends under the movable section 38 and serves to transmit the drive from said section 38 to shaft 25. Key 41, however, merely transmit the drive from shaft 22 to fixed section 37, and a separate key 43 connects axially shiftable section 38 to drive shaft 22. Key 43 is axially slidable in its keyway and is retained in the hub of axially shiftable section 38 by endless rings 44 and 45 mounted in appropriate grooves in the hub 46 of said section 38 at the ends of key 45. The use of separate keys for drive pulley 30 makes possible radial inward movement of belt 32 to the shaft 22 itself without interference with any projecting key. A single key for the driven pulley 31 is satisfactory because the transmission is intended to be used for greater speed reductions than speed increases in driven shaft 25 and hence there is no occasion For belt 32 to be moved radially inward into contact with shaft 25.

Endless rings 44 and 45 are preferably of an "X" cross section and made of polytetrafluoroethylene. In addition to retaining key 43 in hub 46, rings 44 and 45 serve to wipe shaft 22 clean as section 38 is shifted axially on said shaft 22, thereby preventing interference with the movement of said section 38 which might result from the entry of dirt between the hub and shaft.

Similarly, shiftable section 38 of driven pulley 31 is provided with rings 47 and 48 bearing against driven shaft 25, said rings being axially fixed in section 38 and slotted to abut upon the sides of key 42. Said rings 47 and 48 may be of the same cross section as rings 44 and 45, and likewise made from polytetrafluoroethylene. The bores of the shiftable pulley sections 38 may be coated with polytetrafluoroethylene which functions as a lubricant to promote axial sliding of the sections on their respective shafts.

It may be noted that the shiftable sections of the pulleys 30 and 31 are disposed on opposite sides of belt 32, The shiftable section of pulley 30 is shifted axially by a lever 49 and the shiftable section of pulley 31 is shifted axially by a lever 50. Lever 49 rocks upon a straight edge 51 formed on a fulcrum block 52 fixed to a rod 53 disposed in housing 21 and held against axial movement therein by a set screw 54. The upper end of lever 50 rocks upon a straightedge 55 formed in a fulcrum block 56 secured to rod 53 on the other side of the pulleys 30 and 31 from lever 49.

Lever 49 and its connection to shiftable section 38 of pulley 30 are shown in FIGS. 4, 5 and 6. Said lever 49 has an elongated slot 57 formed therein through which hub 46 of the shiftable section 38 extends. Surrounding hub 46 is a thrust cup 58 which is machined to have a pair of spaced axial projections 59, 60 (FIG. 4) which extend toward and embrace the machined sides 61 and 62 of lever 49. Projections 59 and 60 serve to prevent relative rotation between thrust cup 58 and lever 49. Said projections also serve to support opposed pins 63 and 64 which project inwardly toward shaft 22 and provide bearings on which lever 49 rocks and slides as it pivots on straight edge 51 of the fulcrum block 52. The central region of the lever thus forms a yoke around drive shaft 22 and hub 46.

The left-hand end of thrust cup 58, as viewed in FIG. 5, is enlarged and recessed to receive the outer race 65 of a ball bearing 66 mounted on hub 46. To avoid the creation of tilting forces on ball bearings 66 by lever 49, the axial pressure from thrust cup 58 is transmitted to the side of outer race 65 through a pair of diametrically spaced projections 67, 68 within the enlarged end of thrust cup 58. Said projections are preferably rounded at their point of contact with said race 65 (FIG. 6) to permit said race and bearing 66 to rock thereon. Such rocking motion is further facilitated by providing a relief 69 in the thrust cup adjacent the outer periphery of outer race 65, so that but a relatively thin land 70 on the thrust cup is in contact with said outer race 65.

Thus thrust cup 58 functions as a crossmember of universal joint and provides in effect a universal connection between lever 49 and the movable section 38 of pulley 30.

The lever 50 for shifting the axially shiftable section 38 of driven pulley 31 is shown in FIGS. 1 and 3. said lever, in the form illustrated, is made of two plates 71 and 72, the latter being welded or otherwise rigidly secured to the side of lever 71 near the lower end thereof, as viewed in FIG. 3. Plate 71 has an opening 73 through which the hub 74 of the axially fixed section 37 of pulley 30 extends, and a second opening 75 near lower end thereof. Opening 75 is in the form of a notch extending upwardly from the lower end of plate 71. Said notch is closed by a bar 76 suitably welded or otherwise secured to plate 71. Said bar is thicker than plate 71 to provide an opening 77 through which a pivot pin 78 extends. The upper end of pivot pin 78 is enlarged to receive a shaft 79 which extends outwardly to either side of said enlarged upper part. A pair of roller followers 80, 81 is mounted on the protruding ends of shaft 79, the followers being designed to roll on a pair of identical cams 82, 83 fixed to a shaft 84.

Plate 72 has a notch 85 formed in the lower end thereof which embraces the hub 46 of shiftable section 37 of pulley 31 adjacent thrust cup 58' for said shiftable section 38, and bears against the pins 63'64' on said thrust cup in the same manner as lever 49.

The location of lever 49 relative to the fixed pulley section 37 of pulley 30 is determined, in the form chosen to illustrate this invention, by a chain 86, one end of which is fixed to an internally threaded tube 87 into which is threaded a machine screw 88 which passes through a swivel 89 mounted in a suitable opening 90 in the lower end of the lever 49. The other end 91 of chain 86 passes between cams 82 and 83 around a cam surface 93 on shaft 84 and is secured thereto by a pin 92 or other suitable means. As shaft 84 is rotated in a counterclockwise direction, as viewed in FIG. 1, chain 86 wraps around cam surface 93 and pulls the lower end of lever 49 to the left, as viewed in FIG. 1, thereby shifting the movable section 38 of drive pulley 30 toward its fixed section, and thus causes belt 32 to move outward to a greater radius on said drive pulley 30. Rotation of shaft 84 in a clockwise direction as viewed in FIG. 1, has the opposite effect and allows the tension in belt 32 to push the movable section 38 to the right, as viewed in FIG. 1, to follow lever 49 as the chain 86 is lengthened, and thereby causes belt 32 to move radially inwardly to a lesser radius.

Lever 50 for driven pulley 31 is swung about straight edge 55 of fulcrum block 56 in a counterclockwise direction, as viewed in FIG. 1, by rotation of shaft 84 in a clockwise direction, which causes cams 82 and 83 to bear against roller followers 80 and 81, respectively, on said lever 50, and the lever will be moved to the right, as viewed in FIG. 1 in a manner dictated by the contour of the cams 82 and 83. This movement of lever 50 will move the shift able section 38 of driven pulley 31 to the right to decrease the space between the pulley sections of driven pulley 31, and thereby force belt 32 radially outward to a greater radius.

Rotation of shaft 84 in a counterclockwise direction, as viewed in FIG. 1, 1, will allow lever 50 to move to the left in that FIG. and accordingly the side pressure developed by the belt 32 will push the movable section 38 and its thrust cup 58' to the left, as viewed in FIG. 1, holding roller followers 80, 81 against the cams 82 and 83. With the movable section 38 moved to the left, the spacing between the pulley sections is increased, thus allowing belt 32 to move radially inwardly to a lesser radius.

The control for shaft 84 is effected by a knurled knob 94 on the exterior of housing 21, said knob being connected to rotate a shaft 95 (FIGS. 2 and 3) extending vertically downwardly to one side of shaft 84. At the lower end of shaft 95 is disposed a worm 96 which cooperates with a worm wheel 97 fixed to shaft 84 to rotate said shaft 84. A speed ratio indicator (FIG. 8) is provided by a pointer 98 secured to an extension of shaft 84 passing through housing 21 to the exterior thereof, said pointer 98 passing in proximity to suitable indicia 99 on the housing 21 coded for shaft or speed ration, as the case may be.

Rod 53, as well as fulcrum blocks 52 and 56 are fixed relative to housing 21, and an initial adjustment of the movable section of pulley 30 relative to the movable section of driven pulley 31 to establish the desired belt tension may be made by turning machine screw 88 in an appropriate direction to achieve the result desired. Once the correct belt tension is established, turning the control knob 94 regulates the speed ration between the drive and driven shafts, that is, it moves the shiftable section of drive pulley 30 in one direction while at the same time the movable section of the driven pulley 31 is pushed in the opposite direction by the belt, and vice versa Pointer 98 can be initially adjusted to indicate the particular speed ratio then in effect, and all of the sped ratios will then be obtained in accordance with the contour of the cams 82, 83 and 93. Any eccentric thrusts which might be created by the arms upon the thrust cups and their associated shiftable pulley sections are compensated for by the pins 63, 64, the projections 67, 68 and by the resultant adjustment of the thrust cup relative to the antifriction bearing 66.

An alternative from of lever to one shown at 49 in FIG. 1, is shown in FIGS. 9, 10 and 11. Said lever is comprised of weldments 100, 101, 102 and 103, appropriately welded together, the latter two being angle irons which may be identical but disposed in opposed relation to one another to provide space flanges 116 and 117. Said weldments 100 and 101 are spaced from one another, and weldments 102 and 103 are likewise spaced from one another, to form a substantially rectangular opening 104 through which drive shaft 22 of FIG. 1 may pass. Weldment 100 has a notch 112 in the upper edge thereof in which is received rod 53 so that weldment 100 can engage straight edge 51 on fulcrum block 52. A thrust cup 105 of generally cylindrical contour is disposed between the angle irons 102 and 103 concentrically with respect to shaft 22, said thrust cup having opposed recesses 106, 107 in which are disposed rollers 109, the shafts 110, 111 of which are fixed in flanges 116, 117 formed in angle irons 103 and 102. Thus thrust cup 105 can swivel about the centers of rollers 108, 109 to maintain the correct transverse position of the bearing 66 relative to pulley action hub 46 as the lever is pivoted about fulcrum block 52.

THe outer race 65 of antifriction bearing 66 is engaged by a narrow land 113 at the outer periphery of said race 65, and round-headed pins 114 extending axially from thrust cup 105 engage the side or radial surface on outer race 65, there being two such round-headed pins 114 diametrically opposed from one another to permit the outer race to rock slightly about said pins to relieve eccentric thrust on bearing 66.

An opening 115 is formed in bottom weldment 101 to receive machine screw 88 and the swivel 89 therefor.

THe lever shown in FIGS. 9, 10 and 11 functions in precisely the same manner as the lever shown in FIG. 1, but requires less machining for its fabrication.

By rigidly controlling the relative locations of the movable sections with the levers, cams and connecting links, and by selecting correct cam profiles, the factors which heretofore caused variations in belt tension in variable speed pulley drives are eliminated and different curves of speed versus cam shaft position can be obtained.

It may be apparent that in place of chain 76, a rigid pull rod and follower may be used with cam 93 to pull lever 49 to the left as viewed in FIG. 1, and similarly other modification may be made in the various elements of this invention without departing from the spirit of this invention.

I claim:

1. In a variable ratio transmission, a drive shaft, driven shaft disposed with its axis parallel to the drive shaft, a drive pulley mounted on the drive shaft for rotation therewith, a driven pulley mounted on the driven shaft for rotation therewith, each of said pulleys being comprised of a conical axially fixed belt-contacting section and a conical, axially movable belt-contacting section, an endless V-belt encircling both said pulleys and adapted to transmit a drive from the drive pulley to the driven pulley, the axially movable belt-contacting section of the drive pulley being disposed on the opposite side of the V-belt from the axially movable belt-contacting section of the driven pulley, and cam-and-follower means for simultaneously and positively shifting the movable section of one pulley toward its axially fixed section and limiting the movement of the movable section of the other pulley away from its axially fixed section, whereby to change the drive ratio between the drive and driven shafts.

2. A variable ratio transmission as described in claim 1, said shifting means comprising individual shift levers for each axially movable pulley section, a fixed fulcrum for each lever, and universally pivoted means for transmitting movement of the levers to the axially movable pulley section.

3. A variable ratio transmission as described in claim 2, said universally pivoted means comprising a yoke formed in said lever, a crossmember having a rocking connection with said lever, an antifriction bearing disposed between the cross member and the axially movable pulley section moved by said lever, and a pivoted connection between the crossmember and the bearing.

4. A variable ratio transmission as described in claim 3, and slidable interlocking means disposed between the cross-member and the lever to prevent relative rotation between the crossmember and lever.

5. A variable ratio transmission as described in claim 3, said yoke comprising an opening in the lever through which the drive shaft extends, said crossmember having projections which embrace said lever in close-fitting relation therewith to prevent relative rotation between the crossmember and the lever.

6. A variable ratio transmission as described in claim 3, said crossmember being in the form of a cup, the open end of which surrounds the antifriction bearing, said antifriction bearing having a ring-shaped outer race having a radially disposed surface and an outer cylindrical surface, said cup having a pair of projections contacting the radially disposed surface of the said outer race substantially 90° removed from the rocking connection with the lever.

7. A variable ratio transmission as described in claim 3, said crossmember being in the form of a cup, the open end of which surrounds the antifriction bearing, said antifriction bearing having a ring-shaped outer race with a cylindrical outer surface, said open end of the cup having a narrow land contacting said outer race to permit said race to adjust its position angularly with respect to the cup axis.

8. A variable ratio transmission as described in claim 2, said cam-and-follower means comprising a shaft, a cam mounted on said shaft, a follower on one of said levers, and other means on the shaft and bearing against the other of said levers to move said other lever simultaneously with the movement of said one of said levers.

9. A variable ratio transmission as described in claim 2, said cam-and-follower means comprising a control shaft, a cam mounted on said control shaft, a follower on one of said levers, and a flexible means connecting the other of said levers and secured to said control shaft to be wound thereon.

10. A variable ratio transmission as described in claim 9, said flexible means comprising a chain, one end of which is fixed to said control shaft, means connecting the other end of the chain to the other of said levers, and means for adjusting the effective length of the connecting means.

11. A variable ratio transmission as described in claim 9, said flexible means comprising a chain, there being a second cam surface on the control shaft, one end of said chain being secured to said control shaft to wrap around said second cam surface, and the other end of the chain being connected to the other of said levers.

12. A variable ratio transmission as described in claim 2, one of said levers comprising spaced upper and lower weldments secured to spaced side weldments to form a unitary whole having a central opening, said side weldments being further comprised of substantially identical angle irons disposed in opposed relation to one another to provide spaced flanges, and said universally pivoted means including rollers secured to said flanges and bearing against said universally pivoted means.

PO-1050
(5/69)

UNITED STATES PATENT OFFICE
CERTIFICATE OF CORRECTION

Patent No. 3,599,505                    Dated August 17, 1971

Inventor(s) GEORGE H. LOGAN and CLAES L. HULTGREN

It is certified that error appears in the above-identified patent and that said Letters Patent are hereby corrected as shown below:

IN THE ABSTRACT:
Line 2, "pulley" should be --pulleys--;
IN THE PATENT:
Col. 1, line 3, omit "sections" and insert --an--;
Col. 1, line 4, omit "pulley section" (first occurrence) and insert --or--;
Col. 2, line 13, change "sectional" to --section--;
Col. 2, line 43, change "demands" to --depends--;
Col. 2, line 59, change "transmit" to --transmits--;
Col. 2, line 70, change "For" to --for--;
Col. 3, line 4, "SImilarly" should be --Similarly--;
Col. 3, line 14, change comma (,) after "32" to a period (.);
Col. 3, line 43, change "SaId" to --Said--;
Col. 3, line 44, delete "Said" and insert --outer--;
Col. 3, line 54, change "said" to --Said--;
Col. 3, line 74, insert comma (,) between "63'" and "64'";
Col. 4, line 29, change "shift able" to --shiftable--;
Col. 4, line 34, omit "1" (second occurrence);
Col. 4, line 51, insert --speed-- after "shaft";
Col. 4, line 51, change "ration" to --ratio--;
Col. 4, line 61, change "ration" to --ratio--;
Col. 4, line 64, insert a period (.) after "versa";
Col. 4, line 66, change "sped" to --speed--;
Col. 4, line 73, change "from" to --form--;
Col. 4, line 73, insert --the-- before "one";
Col. 5, line 2, change "space" to --spaced--;
Col. 5, line 13, insert --108-- before "109";
Col. 5, line 17, change "action" to --section--;
Col. 5, line 19, change "THe" to --The--;
Col. 5, line 28, change "THe" to --The--;
Col. 5, line 38, change "modification" to --modifications--;
IN THE CLAIMS:
Claim 1, col. 5, line 43, insert --a-- before "driven".

Signed and sealed this 29th day of February 1972.

(SEAL)
Attest:

EDWARD M. FLETCHER, JR.            ROBERT GOTTSCHALK
Attesting Officer                  Commissioner of Patents